United States Patent [19]

Drent

[11] Patent Number: 5,229,475

[45] Date of Patent: Jul. 20, 1993

[54] CO/OLEFIN POLYMERIZATION WITH CARBOXYLIC ACID OR PHENOL

[75] Inventor: Eit Drent, Amsterdam, Netherlands

[73] Assignee: Shell Oil Company, Houston, Tex.

[21] Appl. No.: 805,227

[22] Filed: Dec. 11, 1991

[30] Foreign Application Priority Data

Dec. 13, 1990 [NL] Netherlands .................. 9002739

[51] Int. Cl.$^5$ .............................................. C08G 67/02
[52] U.S. Cl. ..................................... 528/392; 502/162
[58] Field of Search ............................................ 528/392

[56] References Cited

U.S. PATENT DOCUMENTS

| | | | |
|---|---|---|---|
| 3,694,412 | 9/1972 | Nozaki | 260/63 |
| 4,818,810 | 4/1989 | Drent | 528/392 |
| 4,831,114 | 5/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 262745 | 4/1988 | European Pat. Off. . |

*Primary Examiner*—Harold D. Anderson

[57] ABSTRACT

A novel catalyst composition containing a palladium salt, an anion of a non-hydrohalogenic acid with a $pk_a$ of less than 2, a phosphorus bidentate ligand and an acid with a $pk_a$ of at least 4 but less than 6. The catalyst composition effectively polymerizes carbon monoxide and at least one ethylenically unsaturated hydrocarbon to produce linear, alternating polymers.

7 Claims, No Drawings

CO/OLEFIN POLYMERIZATION WITH CARBOXYLIC ACID OR PHENOL

FIELD OF THE INVENTION

The invention relates to novel catalyst compositions suitable for use in the preparation of linear alternating polymers of carbon monoxide with one or more olefinically unsaturated hydrocarbons, and to a process of producing such polymers.

BACKGROUND OF THE INVENTION

The class of linear alternating polymers of carbon monoxide and at least one olefinically unsaturated hydrocarbon has been known for some time. Such polymers were produced by Nozaki, e.g., U.S. Pat. No. 3,694,412, using arylphosphine complexes of palladium moieties as catalysts and certain inert solvents. More recent methods for the production of such linear alternating polymers, now known as polyketone polymers or polyketones are illustrated by a number of published European Patent Applications including nos. 121,965, 181,014, 213,671, and 257,663. The processes generally involve the use of a catalyst composition formed from:
a) a compound of a Group VIII metal
b) an anion of a strong non-hydrohalogenic acid, and
c) a phosphorus bidentate ligand of the general formula (R)(R)P—R'—P(R)(R) in which R independently is a hydrocarbyl or substituted hydrocarbyl group, and R' represents a divalent organic bridging group which contains from two to four carbon atoms in the bridge connecting the two phosphorus atoms.

Preferred catalyst compositions are formed from:
a) a compound of a Group VIII metal selected from palladium, cobalt or nickel,
b) an anion of a non-hydrohalogenic acid with a $Pk_a$ of less than 2,
c) a phosphorus bidentate ligand of the general formula (R)(R)P—R'—P—(R)(R) in which R and R' have the previously indicated meaning.

It has now been found that the polymerization activity of these catalyst compositions can be greatly improved by incorporating therein a weak acid.

SUMMARY OF THE INVENTION

The present patent application therefore relates to novel catalyst compositions formed from a palladium compound, an anion of a non-hydrohalogenic acid with a $pK_a$ of less than 2, a phosphorus bidentate ligand, and an acid with a $pK_a$ of at least about 4 but less than about 6. The invention further relates to the application of these catalyst compositions in the preparation of linear alternating polymers of carbon monoxide with one or more ethylenically unsaturated hydrocarbons.

DETAILED DESCRIPTION OF THE INVENTION

In the catalyst compositions according to the invention, one component is a compound of palladium which is particularly preferred as the Group VIII metal. The source of the palladium in the catalyst compositions is a salt of a carboxylic acid, and in particular, an acetate.

The anions which are used in the catalyst compositions are derived from non-hydrohalogenic acids with a $pK_a$ of less than 2. Examples of such acids are mineral acids such as sulfuric acid and perchloric acid, sulfonic acids such as methane sulfonic acid, trifluoromethane sulfonic acid and para-toluene sulfonic acid, and halocarboxylic acids such as trichloroacetic acid, difluoroacetic acid and trifluoroacetic acid. The source of the anion of an acid in the catalyst compositions is the acid or a salt, particularly a transition metal salt. As an acid, trifluoroacetic acid is very suitable, and as a salt, nickel perchlorate is very suitable. The quantity of the anion of an acid used in forming the catalyst compositions is from about 1 mole to about 100 moles and preferably about 2 moles to about 50 moles per mole of palladium.

The phosphorus bidentate ligands of the general formula (R)(R)P—R'—P(R)(R) where R and R' have the previously stated meanings. R is a hydrocarbyl containing only atoms of carbon and hydrogen or is substituted hydrocarbyl containing additional atoms in the form of carbon atom substituents. Illustrative of aliphatic R groups are ethyl, propyl, hexyl, decyl, 2-chloro, 3-propyl, or 3-chloro-2-methylbutyl. Illustrative hydrocarbon aromatic R groups include phenyl, naphthyl, tolyl and xylyl. Preferred R groups, however are substituted aromatic substituents, particularly those aromatic R groups having a polar substituent, especially an alkoxy substituent, on at least one aromatic ring carbon atom which is ortho to the ring carbon atom through which the substituent is connected to the phosphorus. Such groups include 2-methoxyphenyl, 2-ethoxyphenyl, 2,4-dimethoxyphenyl and 2,4,6-tripropoxyphenyl. Especially preferred as the R group is 2-methoxyphenyl. The R' group is a divalent linking group of up to 10 carbon atoms inclusive with from 2 to 4 carbon atoms in the bridge. Illustrative of suitable R' groups are 1,2-ethylene, 1,3-propylene, 1,2-propylene, 2,2-dimethyl-1,3-propylene and 1,4-butylene. The preferred R' group is 1,3-propylene and the preferred bidentate phosphorus ligand is 1,3-bis[di(2-methoxyphenyl)phosphino]propane. The quantity of bidentate phosphorus ligand is suitably from about 0.5 mole to about 2 moles of the bidentate ligand per mole of palladium, preferably from about 0.75 mole to about 1.5 mole per mole of palladium.

Examples of weak acids with a $Pk_a$ of at least 4 but less than 6 which are eligible to be used as component d) in the catalyst compositions according to the invention include carboxylic acids such as benzoic acid, acetic acid, adipic acid, iso-butyric acid, heptanoic acid, α-phenylbutyric acid, pivalic acid, valeric acid and 2,4,6-trimethylbenzoic acid and phenols such as pentachlorophenol and pentafluorophenol. Acetic acid is the preferred acid having a $Pk_a$ of at least 4 but less than 6. The quantity of acetic acid incorporated in the catalyst compositions is from about 1 mole to about 10,000 moles and in particular from about 1 mole to about 5,000 moles per mole of palladium.

In addition to the components comprising a palladium compound, an anion of an acid with a $Pk_a$ of less than 2, a phosphorus bidentate ligand, and an acid with a $Pk_a$ of at least about 4 but about less than 6, the catalyst compositions according to the invention can optionally contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-Benzoquinone and 1,4-naphthoquinone are preferred. The quantity of organic oxidizing agent used is up to about 5000 moles per mole of palladium and when present, preferred quantities are from about 1 mole to about 1000 moles of palladium.

The polymerization using the catalyst compositions according to the invention is preferably carried out by contacting the monomers with a solution of the catalyst composition in the liquid phase in the presence of a diluent in which the polymers are insoluble or virtually insoluble. Lower aliphatic alcohols such as methanol and ethanol are very suitable as diluents. The polymerization can also be carried out in a gas phase. The olefinically unsaturated compounds which can be polymerized with carbon monoxide are the unsaturated compounds which consist solely of carbon and hydrogen. Examples of suitable hydrocarbon monomers are ethylene and alpha-olefins of up to ten carbon atoms inclusive per molecule, such as propylene, butene-1, hexene-1 and octene-1. The catalyst compositions are particularly suitable for use in the preparation of copolymers of carbon monoxide with ethylene and in the preparation of terpolymers of carbon monoxide with ethylene and with propylene.

The quantity of catalyst composition used in the preparation of the polymers can vary within wide limits. Per mole of olefinically unsaturated compound to be polymerized, a quantity of catalyst composition is preferably used which contains from about $1 \times 10^{-7}$ mole to about $1 \times 10^{-3}$ mole of palladium and in particular from about $1 \times 10^{-6}$ to about $1 \times 10^{-4}$ mole of palladium.

The preparation of the polymers is carried out at a temperature of about 25° C. to about 150° C. and preferably from about 30° C. to about 130° C. The pressure in the preparation of the polymer is from about 2 bar to about 150 bar and preferably from about 5 bar to about 100 bar.

The molar ratio of carbon monoxide to total ethylenically unsaturated hydrocarbon is suitably from about 10:1 to about 1:10 but preferably is from about 5:1 to about 1:5. Subsequent to reaction, the polymer product is recovered from the polymerization mixture as by filtration or decantation. The polymer products are thermoplastic and are used in utilities conventional for other thermoplastics. Illustrative of specific applications are containers for food and drink and automotive parts and housings.

The invention will now be illustrated with reference to the following comparative examples and illustrative embodiments. All polymers made were examined by $^{13}$C-NMR and found to be linear alternating polymers.

COMPARATIVE EXAMPLE 1

Into a stirred autoclave with a volume of 300 ml a catalyst composition solution was introduced consisting of:
50 ml methanol,
0.1 mmol palladium acetate,
2 mmol acetic acid, and
0.15 mmol 1,3-bis(diphenylphosphino)propane.

After removing air from the autoclave, ethylene was pressured in until a pressure of 30 bar was reached and then carbon monoxide was forced in until a pressure of 60 bar was reached. The contents of the autoclave were then brought to 90° C. After 5 hours the contents of the autoclave were cooled to room temperature and the pressure was released. Only a trace of polymer material was formed.

COMPARATIVE EXAMPLE 2

This example was carried out in substantially the same way as Comparative Example 1, but with the following differences:

a) the temperature was 135° C. instead of 90° C., and
b) the time was 15 hours instead of 5 hours. In this case as well, only a trace of polymer material was formed.

COMPARATIVE EXAMPLE 3

This example was carried out in substantially the same way as Comparative Example 1, but with the following differences:

a) the catalyst composition solution contained 10 mmol acetic acid instead of 2 mmol,
b) 20 bar ethylene and 20 bar carbon monoxide were forced into the autoclave instead of 30 bar each, and
c) the time was 1 hour instead of 5 hours. No polymer material was formed.

COMPARATIVE EXAMPLE 4

A carbon monoxide/ethylene copolymer was prepared as follows. Into a stirred autoclave with a volume of 250 ml a catalyst composition solution was introduced consisting of:
50 ml methanol,
0.1 mmol palladium acetate,
0.5 mmol nickel perchlorate, and
0.12 mmol 1,3-bis(di n-butylphosphino)propane.

After removing air from the autoclave, ethylene was forced in until a pressure of 20 bar was reached and then carbon monoxide was forced in until a pressure of 50 bar was reached. The contents of the autoclave were then brought to 70° C. After 4 hours the polymerization was terminated by cooling the reaction mixture to room temperature and releasing the pressure. The polymer was filtered off, washed with methanol and dried.

12.0 g copolymer was obtained. The polymerization rate was 300 g copolymer/g palladium hour.

ILLUSTRATIVE EMBODIMENT 1

A carbon monoxide/ethene copolymer was prepared in substantially the same way as in Comparative Example 4, but with the following differences:

a) the catalyst solution additionally contained 160 mmol acetic acid, and
b) the reaction time was 1.5 hours instead of 4 hours.

12.8 g copolymer was obtained. The polymerization rate was 850 g copolymer/g palladium hour.

COMPARATIVE EXAMPLE 5

A carbon monoxide/ethene copolymer was prepared in substantially the same way as in Comparative Example 4, but with the following differences:

a) the catalyst solution contained 2 mmol trifluoroacetic acid and 0.12 mmol 1,3-bis(diphenylphosphino)propane instead of nickel perchlorate and 1,3-bis(di n-butylphosphino)propane respectively, and
b) the reaction time was 2 hours instead of 4 hours.

15.0 g copolymer was obtained. The polymerization rate was 750 g copolymer/g palladium.hour.

ILLUSTRATIVE EMBODIMENT 2

A carbon monoxide/ethylene copolymer was prepared in substantially the same way as in Comparative Example 5, but with the difference that the catalyst solution additionally contained 160 mmol acetic acid.

22.0 g copolymer was obtained. The polymerization rate was 1100 g copolymer/g palladium hour.

What is claimed is:

1. A process for the preparation of a linear alternating polymer of carbon monoxide and at least one ethylenically unsaturated hydrocarbon, wherein a mixture of carbon monoxide and at least one ethylenically unsaturated hydrocarbon is contacted under polymerization conditions with a catalyst composition formed from a compound of palladium, the anion of a non-hydrohalogenic acid having a pKa less than 2 and a bidentate ligand of phosphorus, the improvement which comprises additionally adding to the catalyst composition a carboxylic acid with a pKa of at least 4 but less than 6, said carboxylic acid selected from the group consisting of benzoic acid, acetic acid, adipic acid, iso-butyric acid, heptanoic acid, α-phenyl butyric acid, pivalic acid, valeric acid, and 2,4,6-trimethylbenzoic acid or a phenol selected from pentachlorophenol or pentafluorophenol.

2. A process as in claim 1 wherein said carboxylic acid is acetic acid.

3. A process for producing a linear alternating copolymer of carbon monoxide and ethylene by contacting carbon monoxide and ethylene under polymerization conditions in the presence of a catalyst composition formed from a palladium compound, the anion of a non-hydrohalogenic acid having a pKa less than 2 and a bidentate ligand of phosphorus, the improvement which comprises additionally providing to the catalyst composition a carboxylic acid with a pKa of at least 4 but less than 6, said carboxylic acid selected from the group consisting of benzoic acid, acetic acid, adipic acid, iso-butyric acid, heptanoic acid, α-phenyl butyric acid, pivalic acid, valeric acid, and 2,4,6-trimethylbenzoic acid or a phenol selected from pentachlorophenol or pentafluorophenol.

4. A process as in claim 3 wherein the acid having a pKa of at least 4 but less than 6 is acetic acid.

5. A process as in claim 3 wherein the catalyst composition additionally contains up to about 10,000 moles per mole of palladium as an organic oxidizing agent.

6. A process for producing a linear alternating terpolymer of carbon monoxide, ethylene and propylene by contacting carbon monoxide, ethylene and propylene under polymerization conditions in the presence of a catalyst composition formed from a palladium compound, the anion of a non-hydrohalogenic acid having a pKa less than 2 and a bidentate ligand of phosphorus, the improvement which comprises additionally providing to the catalyst composition a carboxylic acid with a pKa of at least 4 but less than 6, said carboxylic acid selected from the group consisting of benzoic acid, acetic acid, adipic acid, iso-butyric acid, heptanoic acid, α-phenyl butyric acid, pivalic acid, valeric acid, and 2,4,6-trimethylbenzoic acid or a phenol selected from pentachlorophenol or pentafluorophenol.

7. A process as in claim 6 wherein the acid having a pKa of at least 4 but less than 6 is acetic acid.

* * * * *